A. P. ANDERSON.
ART OF PUFFING STARCH CONTAINING FLOURS.
APPLICATION FILED OCT. 14, 1907.
1,035,836.
Patented Aug. 20, 1912.
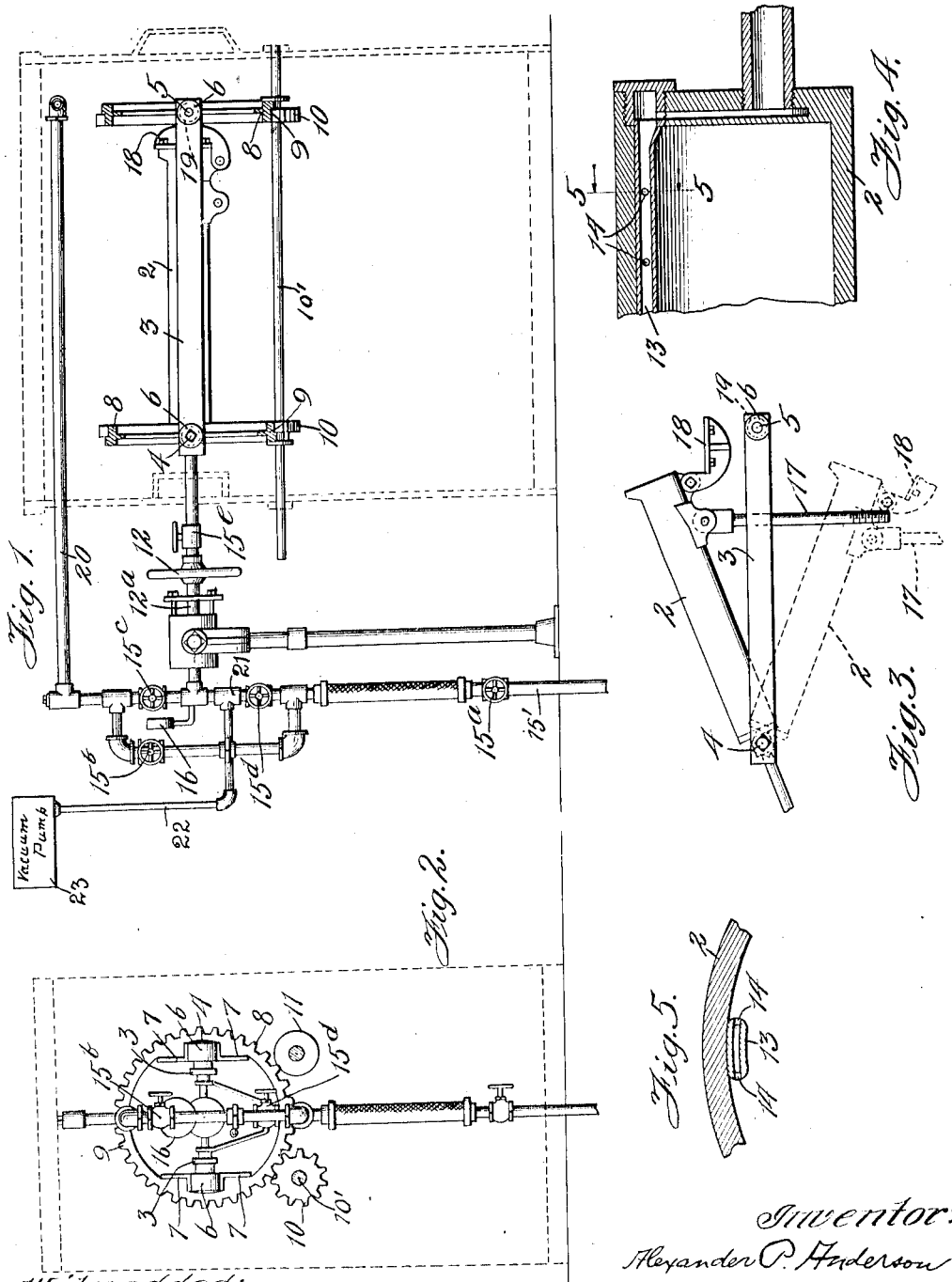
Inventor:
Alexander P. Anderson
by Jones, Addington & Ames
Att'ys

UNITED STATES PATENT OFFICE.

ALEXANDER P. ANDERSON, OF CHICAGO, ILLINOIS.

ART OF PUFFING STARCH-CONTAINING FLOURS.

1,035,836.  Specification of Letters Patent.  Patented Aug. 20, 1912.

Application filed October 14, 1907. Serial No. 397,321.

*To all whom it may concern:*

Be it known that I, ALEXANDER P. ANDERSON, a citizen of the United States, residing at Chicago, in the county of Cook and State of Illinois, have invented new and useful Improvements in the Art of Puffing Starch-Containing Flours, of which the following is a full, clear, concise, and exact description, reference being had to the accompanying drawing, forming a part of this specification.

This invention relates to the art of puffing starch-containing flours,—such, for example, as those made from cereal grains; or other flours containing sufficient starch, as that made from the banana.

The object of the invention is to produce a puffed flour-product which, owing to its porous or cellular condition, is fit for use as a food-product, or for other purposes.

Broadly considered, the complete operation for the production of the final or puffed product comprises three (in some instances only two) steps: first, the pebbling of the material; second, the drying, when necessary; third, the puffing of the dry flour-pebbles.

In carrying out my new process in the preferred manner, the material under treatment is heated in a closed receptacle which is preferably rotated to cause tumbling or rolling about of the material,—provision being made for the reduction of the pressure within the receptacle, for the admission of steam thereinto, and for the sudden reduction of the pressure surrounding the material for the purpose of puffing the same.

In the accompanying drawings I show one form of apparatus suitable for the treatment of flours in accordance with the herein described process.

Figure 1 is a side view of the piping together with a longitudinal sectional elevation of the drum-support in the oven, the latter being indicated in dotted lines; Fig. 2 is a rear end view of the arrangement shown in Fig. 1; Fig. 3 shows the drum in charging and discharging positions,—the latter position being indicated in dotted lines; Fig. 4 is a sectional view of the rear end of the drum; and Fig. 5 is a section of the drum on line 5—5 of Fig. 4.

The material to be treated is put into the drum or cylinder 2, mounted upon a suitable car or frame capable of being rolled about and brought to the various parts of the apparatus for handling. The car consists of two side members 3, 3, having a trunnion 4 extending therebetween at the rear end; a shaft or axle 5 connects the forward ends of said members. Small wheels or rollers 6 are mounted on the outside of the members 3, 3 upon the projecting ends of trunnion 4 and shaft 5. The cars run on a track 7 within the oven consisting of four rails fastened to the inside of the cage 8. At each end of the oven is a ring 9 having teeth on the outside to form a gear which meshes with another gear 10 adapted to be connected to a suitable source of motive power through shaft 10'. The gears 10 and rollers 11 support the cage and inclosed drum in addition to causing rotation thereof. After the drum has been run into the oven a steam-connection is made of 12 thus admitting steam into the flattened pipe 13 inside of the drum. This pipe is provided with holes 14 through which the steam escapes into the drum, said holes becoming more frequent according to the drop in pressure as the steam advances. By means of the gears 9 and 10 the cage containing the drum is rotated slowly during the heating. This rotation is permitted by the stuffing-box 12$^a$ which at the same time maintains a steam-tight connection. The arrangement of the piping shown is as follows: 15$^a$, 15$^b$, 15$^c$, 15$^d$, and 15$^e$ are valves; 16 is a pressure gage. By opening the valves 15$^b$ and 15$^d$ and closing the valve 15$^c$ the steam is by-passed around the drum. By closing 15$^b$ and opening 15$^c$ the pressure in the drum may be brought to any desired point as shown by the gage 16. To reduce the pressure in the drum, valve 15$^c$ may be closed and valves 15$^d$ and 15$^a$ opened, whereby the pressure escapes into the atmosphere through pipe 15'. Thus by proper valve manipulation the conditions of pressure and temperature in the drum may be regulated and controlled within the desired limits. It will be understood that the oven is heated by any suitable means,—as, for example, by gas. The lid 18 of the drum, is clamped closed tightly. A suitable soft-metal gasket is provided to cause an air-tight connection when the drum is in a horizontal position in the frame. In order that the heating may not unseal the lid I prefer to make the drum of bronze, or of some material having a higher coefficient of expansion than the side-members of the frame.

To remove the drum from the oven after the heating, valve 15f is closed, the drum is disconnected at 12, and is run out of the furnace to a raising or lowering mechanism suitably connected with the drum through the arm 17. By means of this mechanism the drum is lowered about the shaft 4 as a pivot, as indicated in dotted lines in Fig. 3. The lid 18, previously held shut by the roller 19 loosely mounted on shaft 5, suddenly flies open due to the internal pressure, and the contents are discharged with considerable force, the material at the same time becoming puffed. In charging, the drum is raised by the arm 17 until it tilts upwardly, when the material to be treated may be fed into the drum.

It will be observed that in Fig. 1 the pipe 20 passes for its greater length through the upper part of the oven. The purpose of this arrangement is to cause superheating of the steam during its passage through said pipe in the drum or cylinder. For the sake of clearness and simplicity I have omitted to show the right end of said pipe 20 connected with a source of steam-supply, inasmuch as such a connection is obvious to any one skilled in the art. Then again, although I have shown the pipe 20 as a single pipe, it is to be understood that said pipe may be coiled back and forth in the oven in order to provide a longer passage of the steam through the oven. Of course, any other suitable form of superheater may be employed, the one shown being for the sake of illustration only.

The interior of the drum may be readily connected with a vacuum and condensing pump by simply tapping the piping at 21, and connecting it through the pipe 22 with a vacuum pump 23, as indicated in Fig. 1. By closing valves 15$^c$ and 15$^d$, and opening valve 15$^e$, the interior of the drum communicates with the pump and may be exhausted to the desired degree of vacuum.

Of course, it is apparent that any convenient form of apparatus may be employed in lieu of the one just described. For instance, the process may be carried out by the apparatus described in my copending applications Serial No. 329,030, filed August 3, 1906, and Serial No. 397,324 filed Oct. 14, 1907.

I shall now proceed to set forth in detail the preferred manner of carrying out my process.

To a suitable amount of wheat-flour, rice-flour, banana-flour or any flour containing sufficient starch, is added enough water to bring the total moisture up to about 20 to 40%. The moisture may be added to the flour in any convenient way,—e. g., by spraying the flour while being stirred. It is important that the moisture be well distributed throughout the material so as not to leave large wet masses, although it is not essential that the moisture should be absolutely uniform in its distribution throughout the whole mass. Such evenness of moisture-distribution as can be obtained by running the sprayed flour through a wire sieve with holes of about one-tenth to one-half inch in diameter, is sufficient. It is not necessary that the flour used should be bolted or in a very fine condition. It is more or less important, however, that the flour should not be too coarse, or too granular. A flour in a bolted or a very finely ground condition will result in a product having a more homogeneous or uniform structure. Of course, the material for treatment should contain sufficient starch and moisture to render the starch-flour more or less sticky when heated, in order that it may form into the desired pebble-like lumps while tumbling or rolling about in the receptacle. A sufficient quantity of flour, preferably prepared as above suggested, is put into the drum or cylinder to fill the same from one-half to three-fourths. The drum being thereupon sealed, rotation and heating thereof is begun inside a suitable oven which is kept at a temperature of about 150 to 250 degrees C. The inclosed flour soon becomes heated up to a temperature where it begins to give off its moisture in the form of steam. This steam fills the space not occupied by the flour, and under the conditions of treatment the flour tumbles and rolls about forming itself into masses or small lumps. These masses soon wear themselves smooth on their surfaces and take the form of nodules or pebbles due to their wearing against each other during the tumbling,—wherefore I conveniently and preferably term these masses "pebble-like lumps." Due to the condensation of steam on their surfaces, these pebbles become sticky, gathering up all of the loose flour and growing in size by accretion, until practically all such loose powder has been taken up. As soon as the temperature of the flour and forming lumps reaches about 100 degrees C., the gage begins to show pressure which increases with the increasing temperature of the material. It is apparent that the time of treatment would vary with the amount of material used and with the temperature of the oven. Also, the pressure necessary for the pebbling varies with the amount of moisture contained in the material. Thus: when the flour contains 40% of moisture a pressure of 5 to 10 pounds per square inch is sufficient for the complete pebbling. With flour containing a smaller percentage (say, 20%) of moisture, complete pebbling requires a pressure of about 40 pounds per square inch. When the flour-pebbles thus formed have acquired a sufficient degree of hardness to prevent their crumbling or powdering, they are ready for the second step, to wit, that of drying the pebbles down to substantially an air-dry condition. This can be accomplished by opening the blow-off valve to allow the confined pressure and steam to escape into the atmosphere. The blow-off is continued until the flour-pebbles have reached the desired degree of dryness. A quick method of accomplishing this drying would be by means of a vacuum,—that is to say by connecting the cylinder with a condenser and vacuum pump. Of course, this second step of drying is not necessary in cases where the pebbled flour is in a substantially air-dry condition at the end of the first step of pebbling; the drying being resorted to only when it is found that the pebbles contain too large a percentage of moisture for the proper puffing of the same. The flour, which is now in the form of dry pebbles, is ready for the next step, to wit, that of puffing. This step may be carried out immediately upon the production of the substantially air-dry flour-pebbles, or at any time thereafter. Thus: the pebbles may be taken out of the cylinder and stored for any length of time. In either case they are heated within the cylinder up to a temperature of about 125 degrees C. or to a pressure of about 25 pounds per square inch. While the cylinder is being rotated and heated in the oven, steam at a pressure of from 150 to 175 pounds per square inch is injected into the same, thereby increasing the pressure within the flour pebbles as well as in the space not occupied by the pebbles. Just before injection the steam is preferably passed through a superheater (e. g., the coil 20, as shown), so that when it enters the cylinder the steam is at a temperature of about 200° C. to 400° C. This steam is fed into the cylinder until the gage indicates a pressure of about 140 pounds, when the steam-injection valve is closed and the steam-pressure left within the cylinder for a minute or more. This pressure is now suddenly reduced whereby the pebbles are discharged from the cylinder as from a gun, increasing in size several times, and becoming porous, cellular and friable. In other words, the pebbles become puffed, and have all of the characteristics of the product claimed in my copending application Serial No. 116,279, filed July 19, 1902. It is preferable to keep the cylinder in continuous rotation during the entire operation, although a short stoppage will not interfere with the results.

Instead of using superheated steam for the creation of the puffing pressure within the cylinder, one might inject dry steam. In practice, however, it has been found that the best results are obtained by the use of superheated steam for the injection.

The steps of pebbling and drying (whenever the latter is necessary) may conveniently be carried out in the apparatus disclosed in my copending application Serial No. 397,324 filed October 14, 1907. In this apparatus I make use of a rotating steam-jacketed cooker within which the flour (containing the desired percentage of moisture) is tumbled and rolled about, while being heated by the jacket-steam which is kept at a pressure high enough to produce sufficient pressure and temperature within the cooker to cause the pebbling of the flour-material. I have found that a jacket-pressure of about 5 to 25 pounds per square inch is sufficient to produce a pressure of from 5 to 25 pounds per square inch within the cooker. After the pebbling has been completed, the pressure is blown off to zero either into the air or through the condenser of a vacuum-pump. If desired, a pressure below atmospheric may be created and maintained within the cooker until the flour-pebbles are dry. During the drying the jacket-pressure may be increased so as to dry the flour more quickly. The flour-pebbles are now removed for storing or for puffing in the cylinder by the injection of steam until the puffing pressure is reached,—all as previously described. It will be found convenient in practice to use the cooker, shown in said copending application Serial No. 397,324, exclusively for pebbling and drying, so that the cylinder or drum herein described may be used only for the puffing. In this way a large saving of time is accomplished.

In the puffing of wheat-flour I desire to direct attention to certain details in connection with the step of pebbling: It is a well known fact that the flour of wheat is distinguished in a remarkable manner from other cereal-flours in that it forms a stiff, tenacious paste or dough when moist. This property of wheat-flour is due to its gluten which, when wetted, swells up and becomes tenacious. It is also known that the gluten of wheat and of similar flours thus wetted loses its tenacity when heated up to a temperature of 100 degrees C. or more. When, as above described, water is added to wheat-flour, there is some difficulty in getting the doughy mass divided up and separated into particles fine enough to pass through a sieve. This passing of the doughy mass through a sieve is desirable in order not to make the flour-pebbles too large and in order to secure a greater degree of uniformity in the size of the pebbles. This difficulty is easily overcome by heating the wetted flour or doughy mass before breaking it up. In this way it may be readily put through the sieve. The heating may be accomplished by putting the sprayed flour into the cylinder or cooker and heating it up to a temperature of about 120 degrees C. Upon being taken out and broken up, it will be found to pass through the sieve without difficulty. In this condition it is again put back into the cylinder or cooker and treated for pebbling and puffing as above explained.

Having described my invention what I claim as new, and desire to secure by Letters Patent of the United States, is—

1. The process of making a puffed product from starch-containing flours which consists in heating and tumbling moist starch-containing flour in a closed receptacle until pressure has formed within the same, whereby, due to the tumbling action, the flour forms into pebbles, then injecting steam into the receptacle to increase the pressure within the pebbles, and then suddenly reducing the pressure within the receptacle whereby the flour-pebbles become puffed.

2. The process of making a puffed product from starch-containing flours which consists in heating and tumbling moist starch-containing flour in a closed receptacle until pressure has formed within the same, whereby, due to the tumbling action, the flour forms into pebbles, then injecting dry steam into the receptacle to increase the pressure within the pebbles, and then suddenly reducing the pressure within the receptacle, whereby the flour-pebbles become puffed.

3. The process of making a puffed product from starch-containing flours which consists in heating and tumbling moist starch-containing flour in a closed receptacle until pressure has formed within the same, whereby, due to the tumbling action, the flour forms into pebbles, then injecting superheated steam into the receptacle to increase the pressure within the pebbles, and then suddenly reducing the pressure within the receptacle, whereby the flour-pebbles become puffed.

4. The process of making a puffed product from starch-containing flours which consists in heating and tumbling starch-containing flour having about 20 to 40 per cent. moisture in a closed receptacle until pressure has formed within the same, whereby, due to the tumbling action, the flour forms into pebbles, then reducing the pressure to dry the flour down to the desired degree of moisture, then injecting steam into the recepatcle to increase the pressure within the pebbles, and then suddenly reducing the pressure within the receptacle, whereby the flour-pebbles become puffed.

5. The process of making a puffed product from starch-containing flours which consists in heating and tumbling starch-containing flour having about 20 to 40 per cent. moisture in a closed receptacle until pressure has formed within the same, whereby, due to the tumbling action, the flour forms into pebbles, then reducing the pressure to dry the flour down to the desired degree of moisture, then injecting superheated steam into the receptacle to increase the pressure within the pebbles, and then suddenly reducing the pressure within the receptacle, whereby the flour-pebbles become puffed.

6. The process of making a puffed product from starch-containing flours which consists in heating and tumbling starch-containing flour having about 20 to 40 per cent. moisture, in a closed receptacle until pressure has formed within the same, whereby, due to the tumbling action, the flour forms into pebbles, then reducing the pressure to dry the flour down to the desired degree of moisture, then reheating the pebbles, then injecting superheated steam into the receptacle to increase the pressure within the pebbles, and then suddenly reducing the pressure within the receptacle, whereby the flour-pebbles become puffed.

7. The process of making a puffed product from starch-containing flours which consists in heating and tumbling starch-containing flour, having about 20 to 40 per cent. moisture, in a closed receptacle until pressure has formed within the same, whereby, due to the tumbling action, the flour forms into pebbles, then reducing the pressure to dry the flour down to the desired degree of moisture, then reheating the pebbles, then injecting steam into the receptacle to increase the pressure within the pebbles, and then suddenly reducing the pressure within the receptacle, whereby the flour-pebbles become puffed.

8. The process of making a puffed product from starch-containing flours which consists in heating and tumbling starch-containing flour, having about 20 to 40 per cent. of moisture, in a closed receptacle until pressure has formed within the same, whereby, due to the tumbling action, the flour forms into pebbles, then reducing the pressure to dry the flour down to about air-dry condition, then reheating the pebbles, then injecting dry steam into the receptacle to increase the pressure within the pebbles, and then suddenly reducing the pressure within the receptacle, whereby the flour-pebbles become puffed.

9. The process of making a puffed product from starch-containing flours which consists in heating and tumbling starch-containing flour, having about 20 to 40 per cent. of moisture, in a closed receptacle until pressure has formed within the same, whereby, due to the tumbling action, the flour forms into pebbles, then reducing the pressure to dry the pebbles down to about air-dry condition, then reheating the pebbles, then injecting superheated steam into the receptacle to increase the pressure within the pebbles, and then suddenly reducing the pressure within the receptacle whereby the flour-pebbles become puffed.

10. The process of making puffed flour pebbles which consists in heating and tumbling moistened starch-containing flour until the moisture thereof has vaporized sufficiently to create pressure and cause pebbles to be formed, then injecting dry steam to increase the pressure, and then suddenly reducing the pressure to puff the pebbles.

11. The process of making a puffed product from starch-containing flour which consists in heating moist starch-containing flour in a closed receptacle until the same, under the action of the heat, becomes sticky, and subjecting the mass to a tumbling action whereby the same forms into lumps or masses, then injecting steam into the receptacle to increase the pressure within the lumps, and then suddenly reducing the pressure within the receptacle, whereby the lumps become puffed.

12. The process of making a puffed product from starch-containing flours, which consists in heating moist starch-containing flour and tumbling the same in a closed receptacle whereby, due to the tumbling action and the heat, pebbles are formed, then injecting steam into the receptacle to increase the pressure within the pebbles, and then suddenly reducing the pressure within the receptacle, whereby the pebbles become puffed.

13. The process of making a puffed product from starch-containing flours, which consists in heating and tumbling starch-containing flour having about 40 per cent. moisture in a closed receptacle whereby, due to the tumbling action and the heat, pebble-like lumps are formed, then drying the pebbles to about air-dry condition, then injecting dry steam into the receptacle to increase the pressure within the pebbles, and then suddenly reducing the pressure within the receptacle, whereby the pebbles become puffed.

In witness whereof, I have hereunto subscribed my name in the presence of two witnesses.

ALEXANDER P. ANDERSON.

Witnesses:
J. JAY SMITH,
LOUISE RAND BASCOM.